F. F. SLOCOMB.
LEATHER STAKING MACHINE.
APPLICATION FILED NOV. 4, 1908. RENEWED DEC. 1, 1913.
1,101,763.
Patented June 30, 1914.
6 SHEETS—SHEET 1.
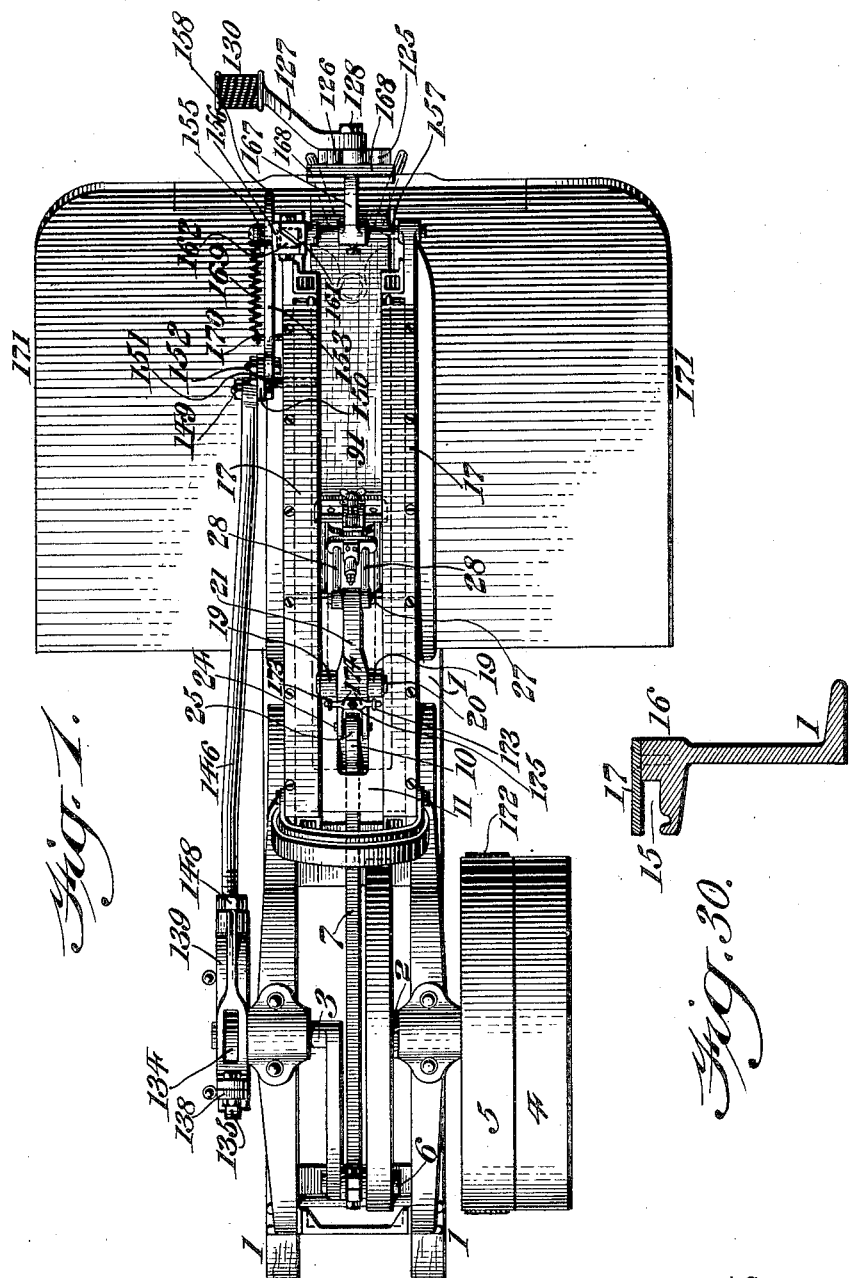

F. F. SLOCOMB.
LEATHER STAKING MACHINE.
APPLICATION FILED NOV. 4, 1908. RENEWED DEC. 1, 1913.
1,101,763.
Patented June 30, 1914.
6 SHEETS—SHEET 2.
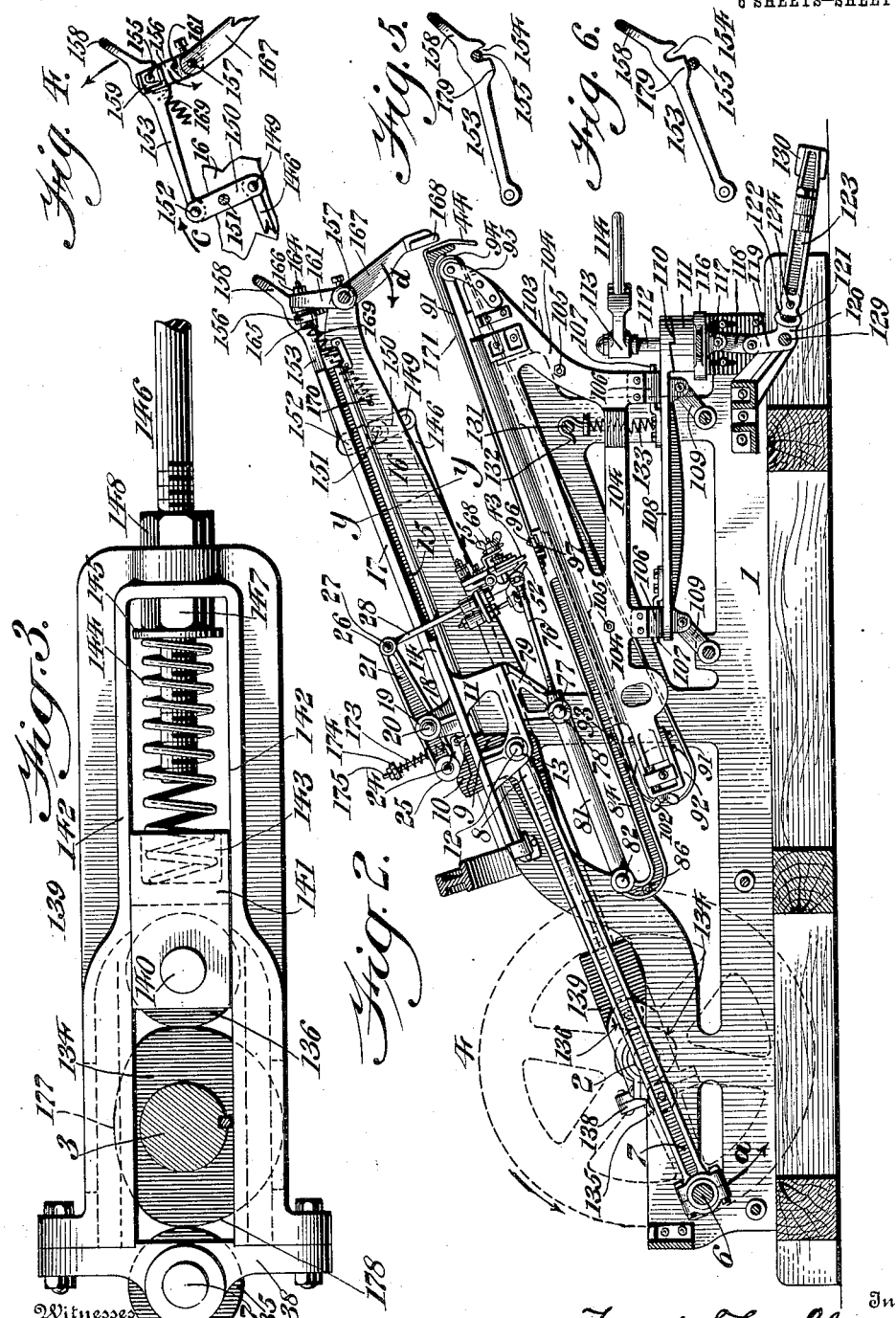
Witnesses
H. G. Dieterich
L. Douville
Inventor
Frank F. Slocomb,
By Wiedersheim & Fairbanks
Attorneys F. F. SLOCOMB.
LEATHER STAKING MACHINE.
APPLICATION FILED NOV. 4, 1908. RENEWED DEC. 1, 1913.
1,101,763.
Patented June 30, 1914.
6 SHEETS—SHEET 3.
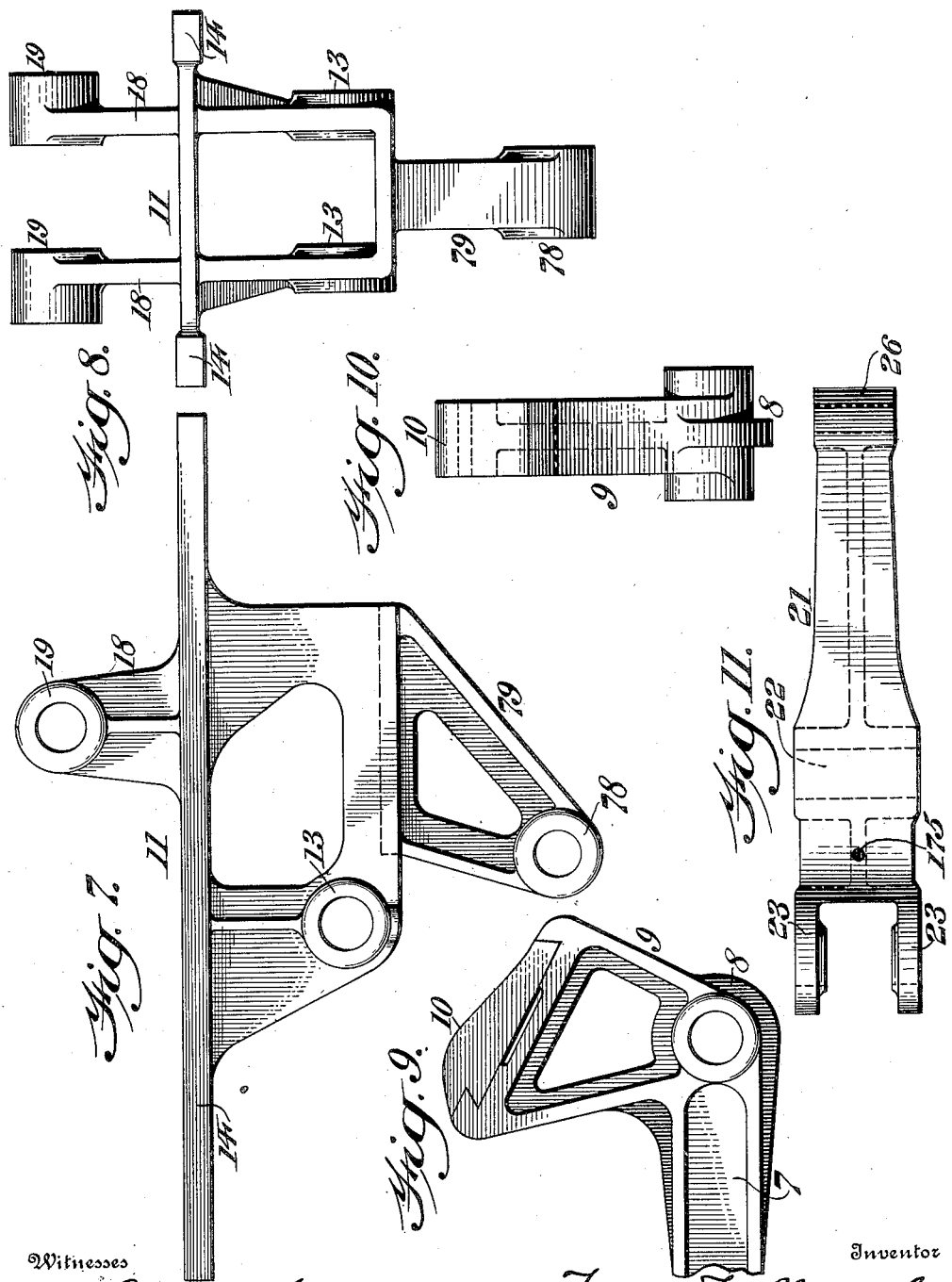

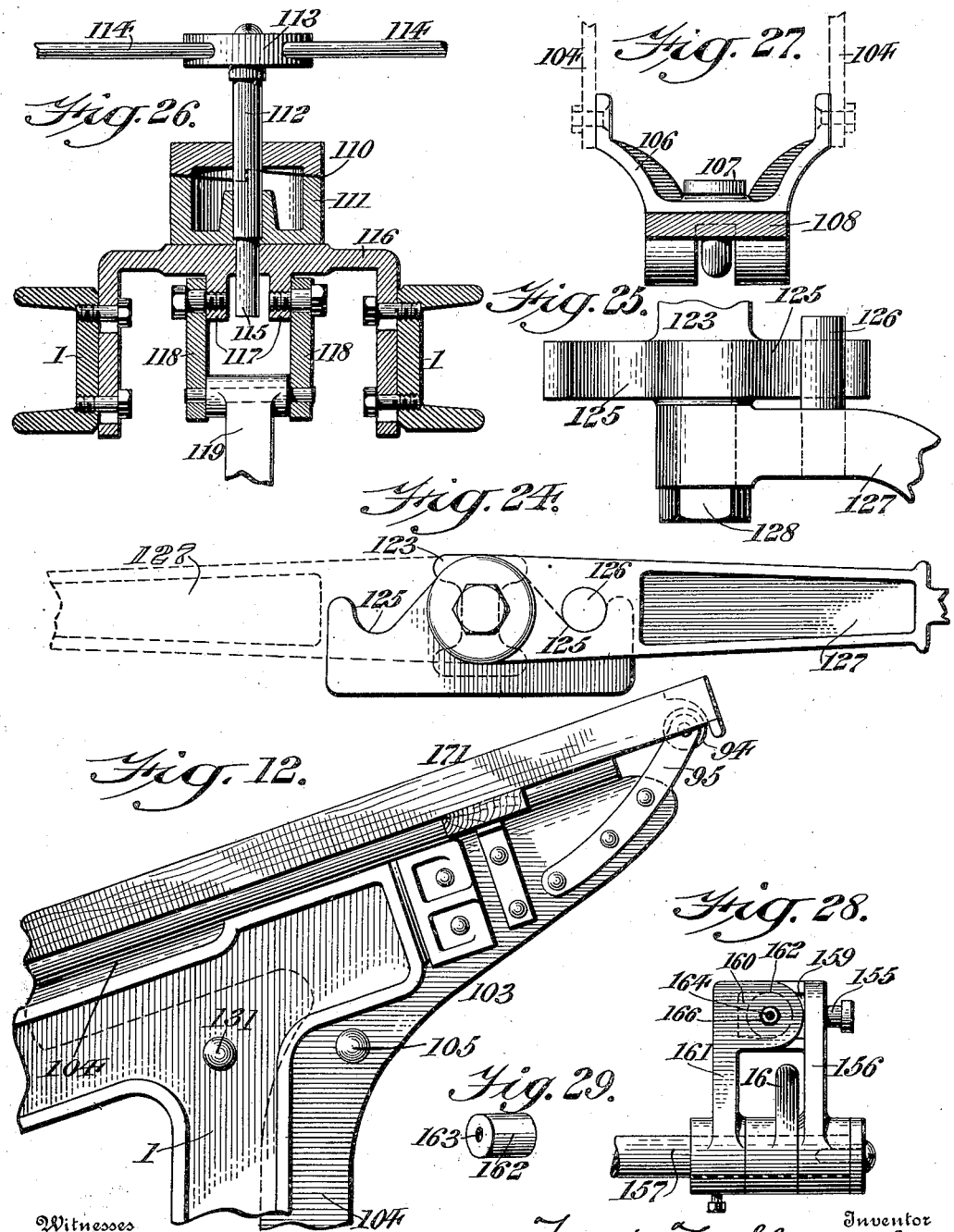

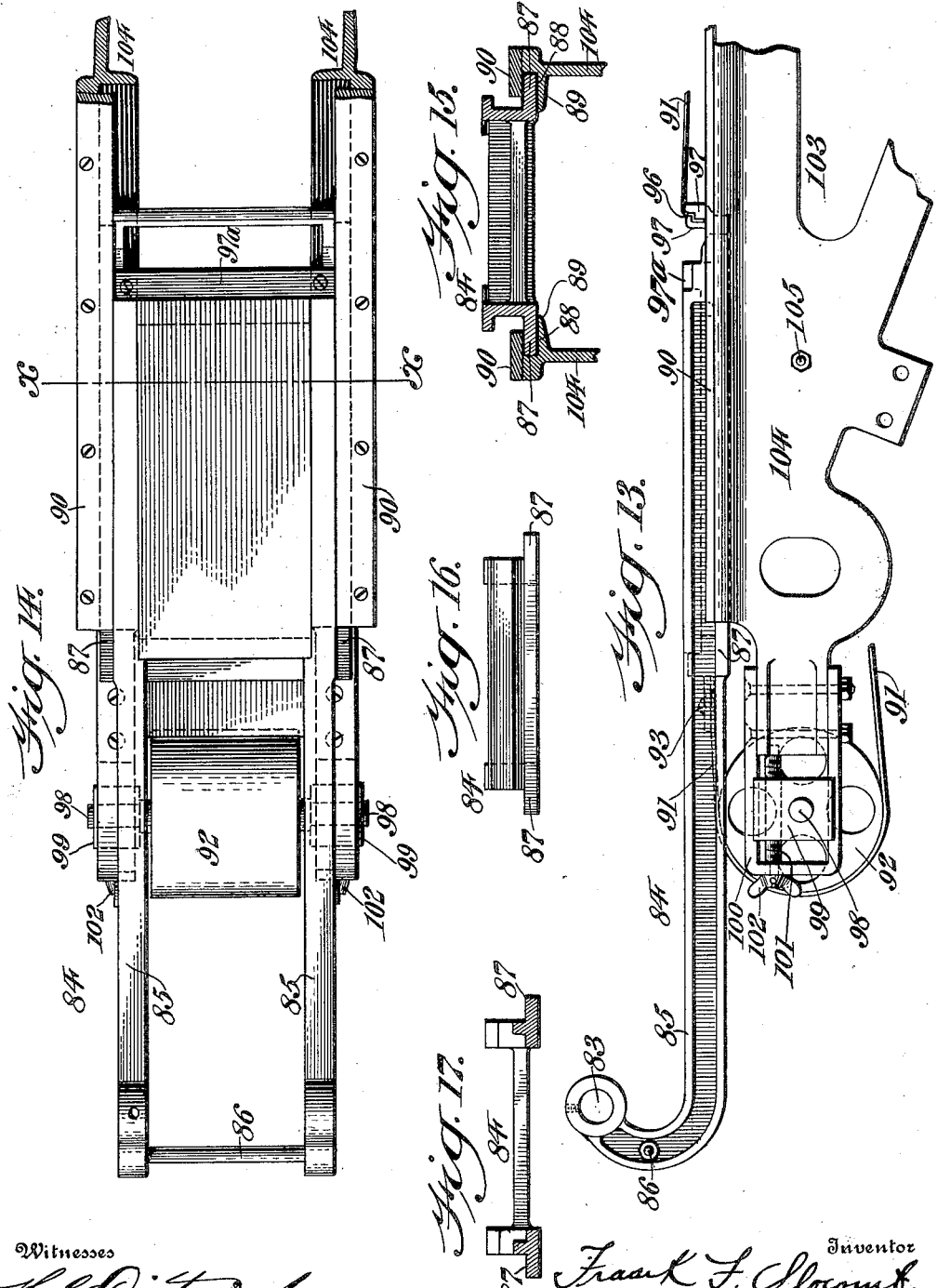

F. F. SLOCOMB.
LEATHER STAKING MACHINE.
APPLICATION FILED NOV. 4, 1908. RENEWED DEC. 1, 1913.
1,101,763.
Patented June 30, 1914.
6 SHEETS—SHEET 6.
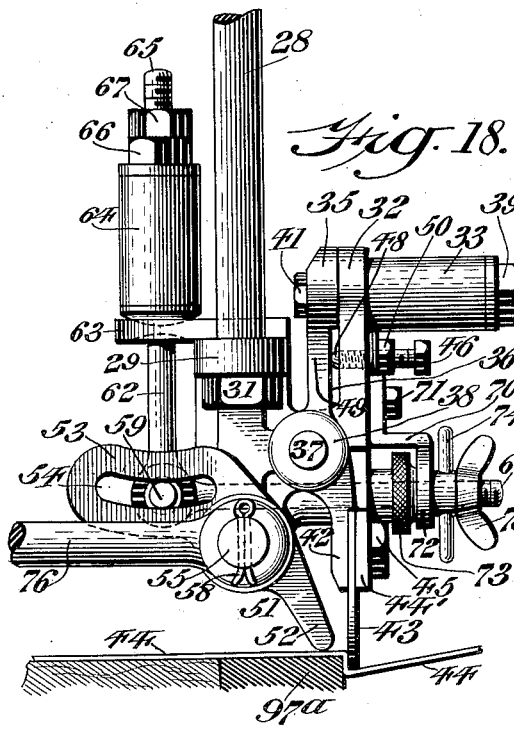
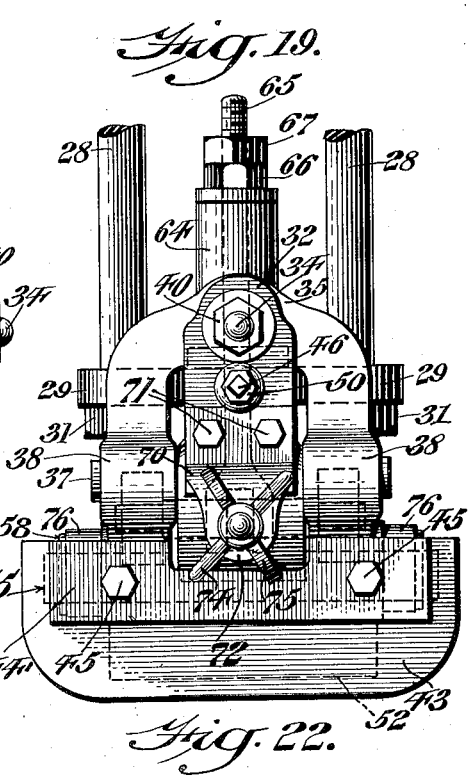
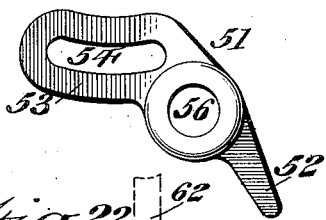
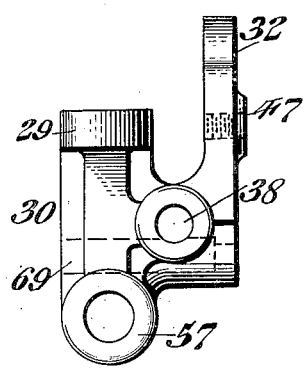
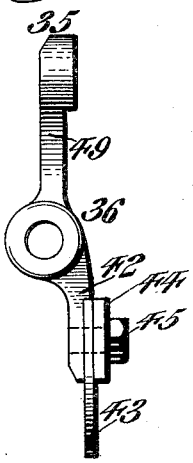
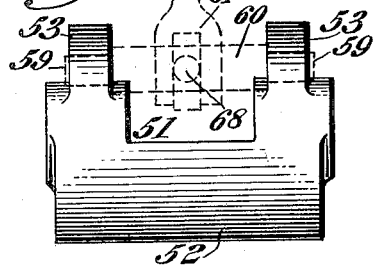
Witnesses
H. S. Dieterich
L. Couville
Inventor
Frank F. Slocomb
By Wiedersheim & Fairbanks
Attorneys
COLUMBIA PLANOGRAPH CO., WASHINGTON, D. C.

UNITED STATES PATENT OFFICE.

FRANK F. SLOCOMB, OF WILMINGTON, DELAWARE, ASSIGNOR TO F. F. SLOCOMB & CO., INCORPORATED, OF WILMINGTON, DELAWARE, A CORPORATION OF DELAWARE.

LEATHER-STAKING MACHINE.

1,101,763.  Specification of Letters Patent.  Patented June 30, 1914.

Application filed November 4, 1908, Serial No. 461,099. Renewed December 1, 1913. Serial No. 804,111.

*To all whom it may concern:*

Be it known that I, FRANK F. SLOCOMB, a citizen of the United States, residing in the city of Wilmington, county of Newcastle, State of Delaware, have invented a new and useful Leather-Staking Machine, of which the following is a specification.

My invention relates to a novel construction of a leather staking machine, wherein provision is made for dispensing with the lower pivotally supported staking arm which has heretofore been generally employed in devices of this class, provision being made for automatically clamping the skin and means being provided for effecting the actuation of the upper staking devices by a cam attached to the connecting rod or oscillating beam, which is actuated from any suitable source of power.

My invention further consists of the combination of a connecting rod or oscillating beam having a cam attached thereto, suitable connections being had from said cam to said staking devices in combination with an automatic clamping device for holding the skins during treatment.

My invention further consists of a novel construction of a head carrying a staking device, supported by a plurality of rods, whereby said staking device is at all times maintained in proper position and relation with respect to their co-acting parts.

My invention further consists in a novel construction of head and a plurality of staking devices carried thereby and novel means for adjusting said staking devices, whereby skins of varying thicknesses can be treated with less liability of injury to the same.

My invention further consists of a novel construction of cushioning or adjusting devices for the rear presser foot or staking device, whereby the latter can be adjusted with great nicety and exactness with respect to the co-acting staking devices.

My invention further consists of a novel construction of a horse, and laterally movable device for accurately adjusting the elevation of the same; of means for sustaining the horse in the desired position; and of provision for a novel construction of treadle reversible to right or left position and supported in both positions.

My invention further consists in a novel construction of a clamp operating yoke and its adjuncts, whereby the moving parts are relieved of much strain and wear their adjustment facilitated and their life increased.

My invention also consists of a novel construction of a bed and horse adapted to be raised and lowered, the weight of the same being maintained in approximate equilibrium in any position by a tension device so that the operator is not required to exert much force in depressing the foot treadle.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of a leather staking machine embodying my invention. Fig. 2 represents a side elevation of Fig. 1. Fig. 3 represents, on an enlarged scale, a side elevation, partly in section, of the yoke for operating the automatic clamping device and its clamping rod, showing also devices for maintaining contact between the cam and co-acting rollers within the yoke. Fig. 4 represents a side elevation showing a portion of the tripping mechanism employed, certain of the parts being omitted from the similar view seen in Fig. 2. Fig. 5 represents a side elevation of the tripping lever in engagement with its co-acting pin. Fig. 6 represents a side elevation similar to Fig. 1, but showing the tripping device out of engagement with its co-acting pin. Fig. 7 represents, in detached position, a side elevation of the carriage or head employed, wherein are mounted the oscillating cam and wherefrom are actuated the co-acting means for operating the staking devices. Fig. 8 represents a front elevation of Fig. 7. Fig. 9 represents a side elevation of the operating cam seen in Fig. 2, in detached position, showing also a portion of the oscillating beam or connecting rod actuating the same. Fig. 10 represents a front elevation of Fig. 9. Fig. 11 represents a plan view of the rocker arm which carries the roller co-acting with the operating cam. Fig. 12 represents, on an enlarged scale, a side elevation of the upper right hand portion of the horse and the lower portion of the clamping device seen in Fig. 2. Fig. 13 represents, on an enlarged scale, a side elevation of the lower left hand portion of the horse and its adjuncts, seen in Fig. 2. Fig. 14 represents a plan view of the device seen in Fig. 13. Fig. 15 represents a section on line x—x, Fig. 14. Fig. 16 represents an end view of Fig. 14. Fig. 17 represents an end view, partly in section, of a portion of the frame seen in Fig. 14. Fig. 18 represents, on an enlarged scale, a side elevation of the staking devices seen in Fig. 2. Fig. 19 represents a front elevation of Fig. 18. Fig. 20 represents a side elevation, in detached position, of the head seen in Fig. 18. Fig. 21 represents a side elevation of the forward staking device, seen in Figs. 2 and 18, in detached position. Fig. 22 represents a side elevation in detached position, of the rear staking device or presser foot seen in Fig. 18. Fig. 23 represents a front elevation of the rear staking device or presser foot, seen in Fig. 22, and its adjuncts. Fig. 24 represents a front elevation of the reversible treadle employed, showing the means for resting and supporting said treadle in its extreme positions. Fig. 25 represents a plan view of Fig. 24. Fig. 26 represents a front elevation, partly in section, of the knee adjusting device seen in Fig. 2. Fig. 27 represents a front elevation, partly in section, of a portion of the treadle mechanism to be hereinafter referred to. Fig. 28 represents on an enlarged scale, a front view of a portion of the clamping mechanism seen in Fig. 2. Fig. 29 represents a perspective view of a portion of the clamping mechanism, to be hereinafter referred to. Fig. 30 represents a section on line y—y, Fig. 2.

Similar numerals of reference indicate corresponding parts in the figures.

Referring to the drawings:—The housing 1 (Figs. 1 and 2) upon any suitable framework, supports crank shafts 2 and 3 in suitable bearings. Shaft 2 carries loose pulley 4 and tight pulley 5 for belt connections. The crank pin 6 is connected to one end of connecting rod or pitman 7, the other end 8 of which is provided with a head 9 having a cam 10 keyed or otherwise secured therein (see Figs. 2 and 9). The end 8 is pivotally secured to carriage 11 by means of pin 12 passing through bearing 13 (see Figs. 2, 7 and 8). The carriage 11 is provided with guides 14 which reciprocate in ways 15 of the upper portion 16 of the housing, the top of said ways being formed by detachable plate 17 (see Figs. 1, 2 and 30). The upwardly extending lugs 18 form bearings 19 for the pin 20 on which lever 21 oscillates, the pin passing through the opening 22 in said lever. In lever 21 I form bearings 23 for pin 24 which supports roller 25 between them. This roller coöperates with cam 10 under spring pressure as hereinafter pointed out. Lever 21, at its forward extremity 26, carries pin 27 which passes through the upper portions of the two rods 28 (see Figs. 1 and 19). The lower extremities of these rods 28 pass through lugs 29 of head 30 (see Figs. 18, 19 and 20). The rods are held in position in these lugs by the nuts or other equivalent fastenings 31. The head 30 carries upwardly extending flange 32 against whose forward face the cushioning device 33 is held. This is preferably a cylindrical piece of rubber or the like through which is passed bolt or other fastening 34. The bolt passes through flange 32 and also through the upper portion 35 of lever 36, which is pivotally supported upon pin 37 mounted in opening 38 in the head 30 (see Figs. 18–21). The bolt 34 is provided with nuts 39 and 40 and head 41. It will be evident that the degree of initial tension holding the end 35 of arm 36 against the flange 32, as well as the extent of pressure required for any given movement of the arm with respect to the flange, is dependent upon the adjustment of the nuts upon bolt 34 and can be varied accordingly (see Fig. 18). The lower portion 42 of the lever 36 is provided with a staking device 43 which is retained by keeper 44 and bolt or other fastening 45. The action of this staking device upon the skin and the operation of the cushioning device appear best from Fig. 18. In order to set and adjust staking device 43, I employ bolt 46 which passes through threaded opening 47 in flange 32 so that the end 48 of this bolt will bear upon the lever 36 at some point such as 49. This bolt is set by jam nut 50 so that the upper end of the lever 36 can be forced away from the flange 32 to any desired degree initially setting the staking device 43 and determining the tension accordingly. The adjustment thus attained is one of great nicety and exactness. The rear staking device or presser foot 51 extends forwardly at 52 and rearwardly in lugs 53 having preferably curved slots 54 therein. Pin 55 passes through the opening 56 of the rear staking device and rests in bosses 57 where it is held by a split pin, key or other device 58 (see Figs. 18, 19 and 20) permitting a slight oscillation of the rear staking device about this pin.

The rear lugs 53 are two in number (see Fig. 23) and form mounts for ends 59 of pin 60, which passes also through the lower end 61 of the eye bolt 62. The upper end of this eye bolt passes through the plate 63 and through the cushioning device 64 above which at 65 the bolt is threaded and provided with lock nuts 66 and 67 affording an adjustment of the position at which movement of blade 52 will cause compression of the cushion. The cushion is preferably formed of a cylindrical rubber or other like material. A fine adjustment of the extent of compression of the cushion with movement of the blade 52 is secured by means of eyebolt 68 whose one end surrounds pin 59 and which passes through opening 69 in head 30 (see Figs. 18 and 20) and is adjusted and locked within bracket 70 which is held in place by bolt 71. The eye bolt 68 passes through an opening in the end 72 of the bracket, upon one side of which is a knurled nut 73 and upon the other side of which are lock nuts 74 and 75, both of which are formed for thumb engagement. As will be readily seen from Fig. 18 the position of the pin 59 within the slot 54 and consequently the leverage which the presser foot exerts in its cushioning action, can readily and quickly be adjusted by hand by means of the thumb nuts indicated. The curved character of the slot 54 and the curving of the lower supporting plate for cushion 64 result in this adjustment being without effect upon the initial position of the presser foot. In practice this quick, easy and exact adjustment of the pressure of the presser foot is quite important. While the adjustment itself is minute it makes possible the attainment of the desired pressure with an accuracy of which the coarser adjustment at 66, 67 is incapable, with a variation of leverage which is new and with a speed which cannot be attained for even approximately the same nicety of adjustment when attempt is made to use the coarser, direct adjustment for fine gradations of pressure. The capability of making a fine adjustment of the fingers is a great advantage also which is not accessible by the devices in use by the prior art, both because of the position of the parts and the character of the fastenings. In existing devices the location of the fastenings interferes also with the rapid and easy use of a wrench.

The pin 55 forms the forward supports of the two rods 76 in addition to supporting the presser foot 51. The rear ends of these rods are supported by pin 77 which has bearings in boss 78 attached to the arm 79 depending from carriage 11 (see Figs. 2, 7 and 8). The pin 77 also passes through the forward end of the rod 81, through whose rear end passes the pin 82, which latter also passes through the opening 83 in the rear portion of the sliding bed 84. The bed 84 is composed of two members 85 which are preferably united and braced in their rear portions by a cross rod 86 (see Figs. 13 and 14). The bed 84 is provided with the slides 87 which reciprocate in guides 88 preferably formed between flanges 89 and removable top strips 90 (see Fig. 15). Upon the forward end of bed 84 I provide a member 97ª which assists in the staking operation by coöperating with the staking devices 43 and 52.

I provide a skin supporting belt 91 arranged, as is well known in the art, about rollers 92 and 94 (supported at 95) and attached to the bed at 93 and 96, the latter being by a plurality of strips 97 which forms one side of the shoulder or slot in which the forward staking device operates. The roller 92 has its bearings 98 mounted in the boxes 99 which are located in the yoke or extension guide 100. These boxes afford passage for threaded stem 101 which is provided with a thumb nut 102 by whose adjustment the boxes can be moved to take up any slack in apron 91.

The horse 103, by which the skin is moved into and out of position for engagement by the staking devices, is made up preferably of side frames 104 braced by cross rods 105. The flanges 89 project from the upper part of the horse and the horse is capable of movement with respect to the main frame both because of its being connected with sleeves or supports 106 which are provided with keepers 107, and because of the mounting of these keepers upon a table 108 which is connected to the main frame 1 through link 109 so as to maintain the table in parallel positions at all times.

For the purpose of lifting the frame 108 two means of movement are provided for it. The one which I will describe first is for giving it the final adjustment to determine the extent to which the skin is to be subjected to the action of the staking devices by reason of its position. This fine adjustment is effected by means of a cam underface 110 of general clutch shape, mating with a corresponding member 111, which is rotatable through shaft 112 by means of lever 113 and arms 114, which are two in number and which are intended to be moved by the knee or hand of the operator to effect the lifting and lowering of the table 108 and horse carried by it through a short distance. The operation of this portion of the structure is best seen by Figs. 2 and 26. The cam faces used may be of any desired coöperative type to produce relative movement preferably by the rotation of the one with respect to the other. The lower part of the shaft 112 is mounted at 115 to rotate in frame 116 carrying the cam member 111 along with it.

The frame 116, by means of a lug 117 and link 118, is connected with a rocker arm 119 constituting part of the major adjustment for the table and horse. The end of the rocker arm 120 is provided with a pin 121 which moves in a slot 122 in the end of a lever 123 which is fulcrumed at 124, permitting a certain amount of movement and limiting movement in both directions. The lever 123 terminates in the arms or recesses 125 which receive a pin 126 of a foot lever 127 which forms a treadle and which can be thrown through approximately a half circle to have the pin 126 engage with the groove or recess 125 upon either side and, correspondingly, to be operated by either a right-handed or left-handed staking machine operator from the position which he would preferably take with respect to the machine. The lever or treadle 127 is fulcrumed in a pin 128 within the end of the lever 123, (see Figs. 24 and 25.) The elbow lever 119 may evidently be fulcrumed at some other point than 129 or differently constructed or mounted in other ways and the treadle and connections may also be differently designed to present foot member 130 for the operator's use in the positions indicated, without departing from my invention.

In order to compensate the weight of the parts forming the horse, including the table 108, I support it from the pin 131 by hook 132 attached to one end of spring 133 whose other end is secured to table 108.

For the operation of the automatic clamp, (see Figs. 1–6) I provide a cam 134 upon shaft 3 and have it engage with rollers 135 and 136. Of these, 135 is journaled at 137 in cap 138 secured at the end of yoke 139, while roller 136 is journaled at 140 in a block 141 guided in ways 142 to follow the surface of the cam. In the present instance block 141 is recessed at 143 to receive a spring 144 which at its opposite end rests upon a washer 145 surrounding threaded rod 146 which is held in desired adjustment by nuts 147 and 148 to set the clamp in any desired position. At its opposite end, rod 146 is pivoted at 149 to one end of a lever 150 fulcrumed at 151 in the upper portion 16 of the housing. The opposite end of lever 150 has pivoted thereto at 152 one end of a latch 153 provided with opening 154 for pin 155 projecting from arm 156 which is loose upon shafts 157. (See Fig. 28.) Latch 153 is provided with a handle 158 so that it may be manually removed from the pin 154 when it is desired to move the automatic clamp to a position different from that in which it is held by the latch. The upper portion of the arm 156 is provided with a pocket at 159 in line with a pocket 160 in the upper portion of the arm 161 which is fast upon shaft 157 (see Fig. 28.) Between these pockets and within them is a cushion or spring 162 preferably of rubber and provided with an opening 163 (see Fig. 29) for passage of bolt 164 whose head 165 and nut 166 limit the circumferential separation of the arms 156 and 161.

The shaft 157 carries a clamping lever 167 having clamping jaw 168. The upper end of arm 156 is drawn rearwardly by a spring 169 toward some convenient fixed point 170 in the housing, whereby the clamping lever is kept released when the pin is out of engagement with the latch and movement in the direction of the arrow 3, Fig. 2, is prevented. The table 171 upon the horse 172 supports the skin to be treated. The staking devices are held out of engagement with the skin except as caused by the operation of the cam, during the movement of the driving belt 172 by means of the downward pull of spring 173 upon cross arm 174 carried by a rod 175 in the rear end of lever 21 and this construction keeps the roller 25 in constant contact with the cam face notwithstanding the rapid movement of the machine. Considerable tension is desirable in the spring 173 to insure firm and constant contact and to avoid chattering. The movement of the crank pin 6 advances the connecting rod 7 which slightly turns upon its pivot 12, bringing cam 10 in operation against roller 25, with consequent motion of the swinging head carrying the staking device and against the pressure of spring 174 which maintains the cam and roller 25 in constant firm engagement. The staking devices are kept out of contact with the skin 44 during this forward movement. The frame 84 advances and retreats in unison with the movement of the connecting rod 7, causing the belt or apron 91 to move correspondingly. During this forward movement of the connecting rod, the cam which operates clamp 168 maintains it out of contact with the skin. The operator then elevates the horse by means of the treadle, carrying belt 91 and table 171 up with it. Upon the beginning of the rearward movement of the connecting rod, the cam face 10 carries the head upon which the staking devices are mounted and these devices down, so as to bring them in contact with the skin, while clamp 168 is engaged with the skin by reason of the movement of the cam controlling it. As the staking device and belt or apron move rearwardly, the skin is subjected to their joint action, because it is held firmly in the machine.

The pressure of the staking device upon the skin may be adjusted by means of levers 114 to vary it slightly therewith, due to the major lifting mechanism of the horse, the levers for this fine adjustment being within easy reach of the operator. When the clamping jaw 168 is released, the skin may be turned to bring any desired parts of it into the proper position for staking. When it is desired to throw the jaw 168 out of position, the handle 158 is elevated and the pin 155 is removed from the slot 154 in the latch 153. The clamp can at any time be thrown into automatic operation again by removing it until the pin 155 again lies within the slot.

It will be evident from Fig. 18 that the rubber springs 33 and 64 permit the staking devices 43 and 52 to adjust themselves to varying thicknesses of skins or in a single skin. From Figs. 28 and 29 it will be evident that the rubber spring 162 in pockets 159 and 160 relieves the journals and entire clamp operating structure from undue strain. Referring to Fig. 3, it will be seen that the jaw 168 may be brought closer or farther from the front edge of the table 171 independently of the motion of the yoke 139 by the adjustment of the nuts 147 and 148, loosening 148 and tightening 147 to cause the jaw 168 to approach the clamping position, and the reversed to space it therefrom.

Having thus described my invention, what I claim as new and desire to secure by Letters Patent, is:—

1. In a machine of the character described, the combination of a connecting rod, a cam carried by said connecting rod, a walking beam engaging the cam at one end, staking devices pivoted to said walking beam, and an automatic clamp for temporarily retaining the skin in position during the act of staking.

2. In a machine of the character described, the combination of a crank wheel, a connecting rod actuated thereby, a cam on said connecting rod, a walking beam engaging the cam at one end, staking devices pivotally connected with the other end thereof, an automatic clamping device, and connections from said clamping device to said crank wheel.

3. In a machine of the character stated, a carriage having staking devices mounted thereon, means for reciprocating said carriage, a horse, a foot-treadle, means intermediate said horse and treadle and connected to the same to raise the horse when the treadle is depressed, a cam device in said horse-raising means, and means for actuating said cam device to adjust the elevation of the raised horse.

4. In a leather staking machine, a carriage, means for actuating the same, staking devices supported by said carriage, a horse adapted to be raised and lowered, a staking device carried by said horse, a reversible foot treadle for moving the said horse and staking device carried thereby into operative relation with the staking devices supported by said carriage and means for changing the degree of elevation of said bed while in its raised position.

5. In a machine of the character described, a swinging head, a forward staking device mounted thereon, a presser foot also mounted on said head, a sliding frame, a lower staking device mounted on said sliding frame, means for retaining said head in horizontal relation with said lower staking device, a connection from said frame to said head retaining means, in combination with an endless apron mounted on said sliding frame and an automatic clamp for retaining a skin in position during the act of staking.

6. The combination of a swinging head, a staking device carried thereby, a stay rod, a lower staking device, connections from said rod to said swinging head, whereby the latter is retained in proper relation to said lower staking device, means for supporting and actuating said swinging head and stay rod, a sliding frame on which said lower staking device is mounted, an apron carried by said sliding frame and an automatic clamping device for retaining a skin in position during the act of staking.

7. The combination of a swinging head, a staking device carried thereby, a stay rod, a lower staking device, connections from said rod to said swinging head, whereby the latter is retained in proper relation to said lower staking device, means for supporting and actuating said swinging head and stay rod, a sliding frame on which said lower staking device is mounted, and an apron carried by said sliding frame in combination with an automatic clamping device for temporarily holding a skin in position during treatment.

8. In a machine of the character described, the combination of a swinging head, staking devices carried thereby, a second staking device, means for supporting said swinging head, a connecting rod, a cam carried by said connecting rod, connections intermediate said cam and swinging head for actuating the latter, and means for supporting and actuating said second staking device.

9. In a machine of the character described, the combination of a swinging head, staking devices carried thereby, a lower staking device, means for supporting said swinging head, a connecting rod, a cam carried by said connecting rod, connections intermediate said cam and swinging head for actuating the latter and a sliding frame adapted to support said lower staking device.

10. In a machine of the character described, the combination of a swinging head, staking devices carried thereby, a lower staking device, means for supporting said swinging head, a connecting rod, a cam carried by said connecting rod, connections intermediate said cam and swinging head for actuating the latter from the cam, and a sliding frame adapted to support said lower staking device in combination with an automatic clamping device for temporarily holding the skin to be staked.

11. In a machine of the character described, the combination of a swinging head, staking devices carried thereby, a lower staking device, means for supporting said swinging head, a connecting rod, a cam carried by said connecting rod, connections intermediate said cam and swinging head for actuating the latter thereby, and a sliding frame adapted to support said lower staking device, in combination with an apron also carried by said frame, and an automatic clamping device for temporarily holding a skin during treatment.

12. In a machine of the character described, the combination of a swinging head, staking devices carried thereby, a second staking device, means for supporting and actuating said second staking device, a laterally movable device, connections from said laterally movable device to said second staking device for adjusting the latter, a foot treadle, and connections from said foot treadle to said second staking device, for dropping and raising the same.

13. In a machine of the character described, the combination of a swinging head, staking devices carried thereby, a second staking device, means for supporting and actuating said swinging head, means for supporting and actuating said second staking device, a laterally movable device, connections from said laterally movable device to said second staking device for adjusting the latter, a reversible foot treadle, and connections from said reversible foot treadle to said second staking device, for dropping and raising the same.

14. In a machine of the character described, the combination of a swinging head, a pad carried thereby, a cushioning device for said pad, a knife carried by said head in advance of said pad, a cushioning device for said knife, a lower staking device, means for supporting and actuating said swinging head and means for supporting and actuating said lower staking device.

15. In a machine of the character described, the combination of a swinging head, means for actuating and imparting an oscillatory movement to said head, a presser foot mounted on said head and having a rearwardly extended slotted member, a plurality of adjusting devices engaging said slotted member, and a lower staking device adapted to co-act with said presser foot.

16. In a machine of the character described, the combination of a swinging head, means for actuating and imparting an oscillatory movement to said head, a presser foot mounted on said head and having a rearwardly extended slotted member, a plurality of adjusting devices extending vertically and laterally and engaging said slotted member, a knife carried by said head in advance of said presser foot, means for adjusting said knife with respect to said presser foot, a lower staking device and means for actuating the latter.

17. In a machine of the character described, a swinging head, means for actuating and imparting an oscillatory movement to the latter, a pad carried by said head and having a projecting slotted portion, a vertically and laterally extending adjusting device, connections from the latter adapted to engage said slot, and locking means for said adjusting devices.

18. In a machine of the character described, the combination of a swinging head, means for actuating the same, a hinged arm carried thereby, a staking knife supported by said arm, means located in advance of said knife for regulating the tension on said staking knife and means to cushion said knife.

19. In a machine of the character described, a swinging head, means for actuating and oscillating the same, a presser foot pivotally supported on said head, and vertically and laterally extending means for regulating pressure upon said presser foot.

20. In a leather staking machine, a head, a staking device supported thereby, a presser foot or pad, a pivot pin for the latter, and means for changing the distance between said pivot pin on which said presser foot rocks and the point at which the spring pressure is brought to bear against said presser foot.

21. In a machine of the character described, a swinging head, means for actuating the same, a presser foot pivotally supported by said head, a slot in said presser foot, a pin engaging said slot, an eye bolt secured to said pin, a tension device mounted on said eye bolt, a second eye bolt engaging said pin, and a thumb nut on said second eye bolt for adjusting the position of said pin in said slot.

22. In the machine of the character described, a connecting rod, means for actuating the same, a cam mounted on said rod, a carriage, a rock arm mounted on said carriage, a roller carried by said rock arm, a tension device for maintaining said roller in contact with said cam, a swinging rod carried by said rock arm, a head adapted to support a staking device, and a connection from said swinging rod to said head.

23. In a machine of the character described, a connecting rod, means for actuating the same, a cam mounted on said rod, a carriage, staking devices supported by said carriage, connections from said staking devices to said cam to operate the staking devices thereby, an automatic clamp, means for actuating the same, a reciprocating frame and a lower staking device carried by said frame.

24. In a leather staking machine, a crank shaft, a cam mounted thereon, a plurality of rollers adapted to engage said cam, means for maintaining said rollers in engagement with said cam, a yoke carrying said rollers, a rod actuated by said cam, a rock shaft, a pair of arms, one of which is loosely mounted on said rock shaft, the other being fast to the same, projections on said arms, and a spring extending between said projections for the purpose of taking up jar and reducing wear.

25. In a device of the character stated, a connecting rod, a cam thereon, an oscillating arm engaging said cam at one end, a rod pivoted to said arm at the other end, a head mounted upon the rod, means for maintaining the horizontal position of said head, staking devices for said head, and means for supporting a skin to be acted upon by the staking devices.

26. In a machine of the character stated, a carriage having staking devices mounted thereon, means for reciprocating said carriage, a horse, a foot treadle, means intermediate said horse and treadle and connected to the same to raise the former when the latter is depressed, a cam device in such horse-raising means, and a knee-lever connected to said cam device and projecting to be actuated by the leg of the operator to adjust the elevation of the raised horse.

27. In a machine of the character stated, a carriage having staking devices mounted thereon, means for reciprocating the same, a horse, a foot-treadle, a frame connected to said treadle to be raised by depression of the latter, a cam-member connected to the horse, a coöperating movable cam-member upon the frame, and a knee-lever connected to move said latter cam-member and projecting to be actuated by the leg of the operator to adjust the elevation of the raised horse.

FRANK F. SLOCOMB.

Witnesses:
   E. HAYWARD FAIRBANKS,
   WM. CANER WIEDERSEIM.

---

Copies of this patent may be obtained for five cents each, by addressing the "Commissioner of Patents, Washington, D. C."